(12) United States Patent
West et al.

(10) Patent No.: US 8,771,813 B2
(45) Date of Patent: *Jul. 8, 2014

(54) BIODEGRADABLE TUBE WITH RESTRICTOR PORTION

(76) Inventors: Ellery West, Crescent City, CA (US); Gail West, Crescent City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/496,246

(22) PCT Filed: Sep. 16, 2010

(86) PCT No.: PCT/US2010/049068
§ 371 (c)(1),
(2), (4) Date: May 24, 2012

(87) PCT Pub. No.: WO2011/034998
PCT Pub. Date: Mar. 24, 2011

(65) Prior Publication Data
US 2012/0241354 A1    Sep. 27, 2012

Related U.S. Application Data

(60) Provisional application No. 61/242,930, filed on Sep. 16, 2009.

(51) Int. Cl.
*B32B 1/02* (2006.01)
*B65D 85/00* (2006.01)

(52) U.S. Cl.
USPC ....... 428/34.2; 428/34.3; 428/35.2; 428/35.3; 428/35.4; 428/35.7; 428/35.9; 428/36.6; 428/36.8; 206/277; 206/524.2; 206/524.9

(58) Field of Classification Search
USPC ........... 428/34.1–34.7, 35.2–35.4, 35.7–35.9, 428/36.4–36.91; 206/524.1, 524.3, 524.6, 206/524.9, 581, 484, 484.2, 447, 813, 823, 206/385, 277, 210
See application file for complete search history.

(56) References Cited

U.S. PATENT DOCUMENTS

| | | | |
|---|---|---|---|
| 548,890 | A | 10/1895 | Scales |
| 2,119,926 | A | 2/1937 | Quittner |
| 2,386,498 | A | 10/1945 | Ostrander |
| 2,430,046 | A | 11/1947 | Dreyfus |
| 2,880,913 | A | 4/1959 | Peyron |
| 3,307,738 | A | 3/1967 | Scheindel |
| 3,347,419 | A | 10/1967 | Brandt |

(Continued)

FOREIGN PATENT DOCUMENTS

| | | |
|---|---|---|
| EP | 1035025 | 9/2000 |
| GB | 474561 | 11/1937 |
| GB | 1598267 | 9/1981 |

*Primary Examiner* — Walter B Aughenbaugh
(74) *Attorney, Agent, or Firm* — Fish & Tsang LLP

(57) ABSTRACT

A container for semi-solid compositions comprising a tube portion having a first paper that defines first, second, and third plies forming an open end and a closed end, the tube portion comprising a lumen containing a semi-solid composition. The tube portion comprises a continuous coating that is a permeation barrier to the semi-solid composition, which is disposed between the first and second plies and the second and third plies. The container also includes a restrictor portion sized and dimensioned to couple with the open end of the tube portion and an end closure member sized and dimensioned to mate with the restrictor portion. The tube portion, restrictor portion, and end closure are made of one or more biodegradable materials.

20 Claims, 2 Drawing Sheets

(56) References Cited

U.S. PATENT DOCUMENTS

| | | |
|---|---|---|
| 3,353,714 A | 11/1967 | Trecek |
| 3,917,116 A | 11/1975 | Mason |
| 3,984,268 A | 10/1976 | Holoubek |
| 4,196,825 A | 4/1980 | Kincaid |
| 4,693,396 A | 9/1987 | Tavass |
| 4,780,017 A | 10/1988 | Bradford |
| 5,217,164 A | 6/1993 | Sullivan |
| 5,676,990 A | 10/1997 | Wawrzynski |
| 5,712,042 A | 1/1998 | Cain |
| 5,931,344 A | 8/1999 | Montague-Smith |
| 7,048,975 B1 | 5/2006 | Tojo |
| 7,344,784 B2 | 3/2008 | Hodson |
| 7,819,251 B2 * | 10/2010 | West et al. .................. 206/581 |
| 2005/0023184 A1 | 2/2005 | Ramet |
| 2006/0041036 A1 | 2/2006 | Mohanty |
| 2006/0051603 A1 | 3/2006 | Cleveland |
| 2007/0131713 A1 | 6/2007 | Hill |
| 2007/0267439 A1 | 11/2007 | Farzan |
| 2010/0200591 A1 | 8/2010 | Myerscough |

* cited by examiner

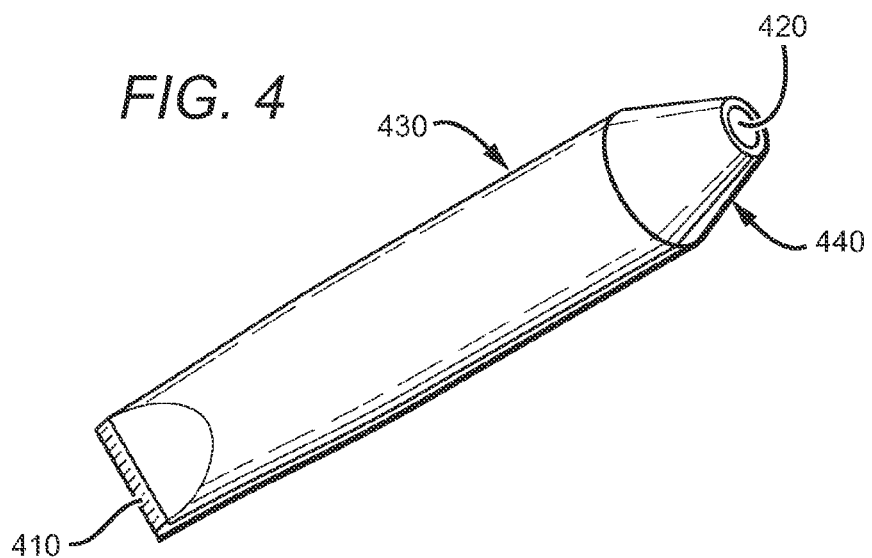
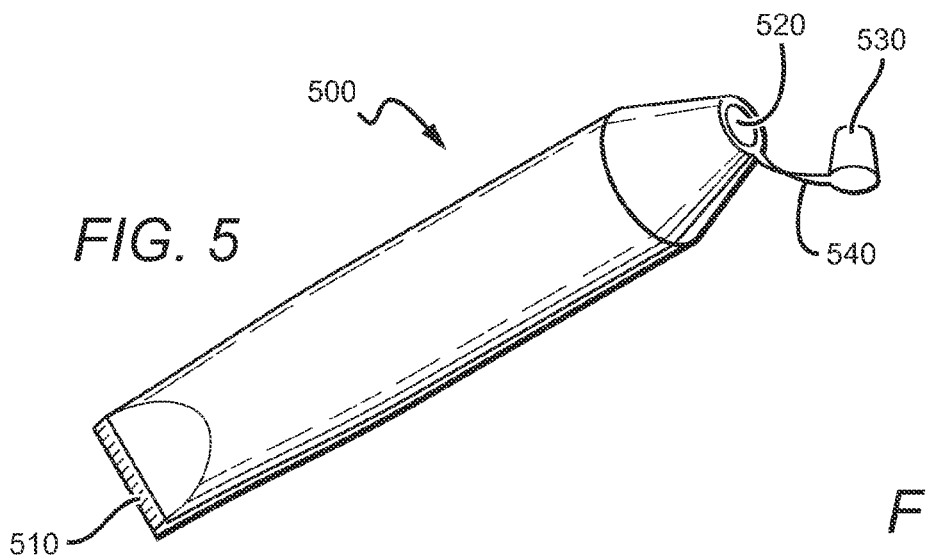
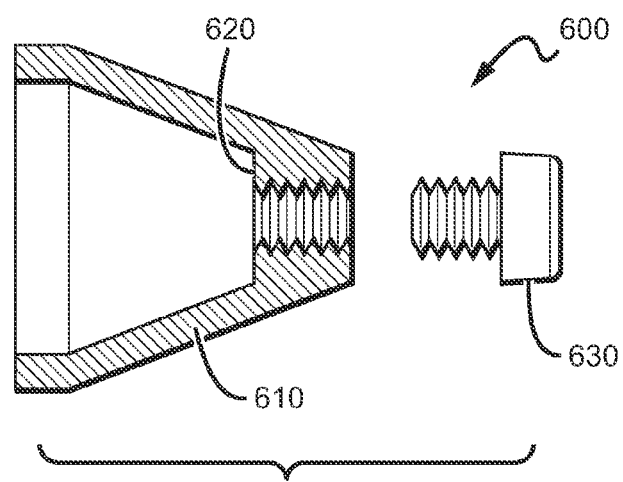

BIODEGRADABLE TUBE WITH RESTRICTOR PORTION

PRIORITY APPLICATION

This application claims priority to U.S. Provisional Application No. 61/242,930, filed Sep. 16, 2009 which is incorporated herein in its entirety.

FIELD OF THE INVENTION

The field of the invention is containers comprising paper and/or other fibrous materials.

BACKGROUND

Modern nations currently produce more waste than at any other time in history. Much of the waste comes from plastic and/or metal, which decomposes at a very slow rate. These materials must be recycled, dumped into the oceans or waterways, or deposited into landfills where they will remain for centuries. Unfortunately, plastic dispensing containers are used in almost every consumer market.

In order to reduce the waste in our ever-filling landfills, it is advantageous to create containers that are biodegradable and/or compostable. In an attempt to provide a more degradable container, the use of plastics such as polylactic acid polymers (PLA) have become more commonplace. However, such plastics still require specialized processes and facilities for degradation, which results in significant costs. In addition, PLA and similar plastics are visibly indistinguishable from normal plastics. This can be problematic because plastic products are not easily ascertainable as biodegradable and if the PLA is inadvertently placed within a group of traditional plastics to be recycled, the PLA can interfere with the entire recycling process.

Plastic container systems with caps and lids are widely known in consumer goods and products. Closed end flexible tubes with a dispensing nozzle (i.e. restricted diameter aperture) are well known for viscous products including but not limited to toothpaste, paints, cosmetics, creams, adhesives, polishes and food products such as ketchup, mustard, mayonnaise because they conveniently provide for multiple uses. Tubes of this kind are generally made of thin flexible layers of plastic, paper with rubberized coating, or metal (such as aluminum), and/or combinations thereof, and usually have a plastic or metal screw or flip top. U.S. Pat. No. 548,890 to Scales, U.S. Pat. No. 2,119,926 to Quittner, U.S. Pat. No. 2,430,046 to Dreyfus, U.S. Pat. No. 2,386,498 to Ostrander, U.S. Pat. No. 3,307,738 to Scheindel, U.S. Pat. No. 353,714 to Trecek, U.S. Pat. No. 3,347,419 to Brandt, U.S. Pat. No. 4,196,825 to Kincaid, U.S. Pat. No. 4,693,396, and US20050023184 to Ramet are examples of prior art tubes. Millions of flexible "paste" tubes are being used and discarded on a daily basis, adding significantly to the current landfill problem. Metal and plastic flexible "paste" tubes are not biodegradable, and plastic "paste" tubes and plastic screw caps may persist in the environment for hundreds of thousands of years.

Unlike PLA-based containers, paper containers are easily ascertainable as biodegradable. There are paper based containers in the prior art, including for example the disposable dispensing container of US2007/0131713 to Hill. In addition, EP1035025 to Lowry teaches a container having a body and a cap that is made substantially out of paper, but like Hill uses some sort polymer or foil as a liner for rendering the container impermeable to its contents. The use of foils and polymers in Lowry impart biodegradability issues and still contribute to our landfill problem. US20050023184 to Ramet also teaches a tube having a fibrous outer layer, but the tube has an inner layer made of non-biodegradable materials and the cap is also non-biodegradable.

It is also known to coat paper to render it impermeable to liquids. U.S. Pat. No. 7,344,784 to Hodson discusses fibrous sheets that can be impregnated or otherwise coated with polymers or blends to provide resistance to liquids. Hodson contemplates that the coated sheets can then be used to manufacture many articles including jugs and cups.

U.S. Pat. No. 7,048,975 to Tojo teaches a pulp molded container that utilizes a synthetic resin (like an acrylic resin) coating on the inner surface of the container for rendering it impermeable to its contents. Tojo makes a significant improvement over the previous paper containers by molding pulp fibers; but like Hill and Lowry, Tojo's synthetic resin imparts biodegradability issues. Still further, Tojo contemplates that a molded cap can be used with the container, but Tojo fails to contemplate the cap being coated. Similar to Tojo, is the 360 paper water bottle from Brand image, which is depicted at http://www.brand-image.com/en/#.

U.S. Pat. No. 5,217,164 to Sullivan teaches a biodegradable dispenser that uses inner and outer sleeves of paper to house a product in stick form. Sullivan contemplates coating the inner surface of the concentric peel-off sections of the inner sleeve (which defines the product lumen) to render it impermeable to the product. However, Sullivan fails to contemplate coating other areas of the inner sleeve, or the cap portion of the outer sleeve. Thus, like Tojo, Sullivan fails to contemplate a paper container having a coated cap.

The extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for a biodegradable container having a closable end, wherein the container and the closeable end are substantially impermeable to a semi-solid composition.

SUMMARY OF THE INVENTION

The inventive subject matter provides apparatus and methods in which a container for semi-solid compositions, comprises: (1) a tube portion having first, second, and third plies of a first paper which defines an open end and a closed end, and a lumen containing the semi-solid composition, and further comprising a coating that is substantially impermeable to the semi-solid composition, and disposed between the first, second, and third plies; (2) a restrictor portion sized and dimensioned to couple with the open end of the tube portion; (3) an end closure member sized and dimensioned to mate with the restrictor portion; and (4) wherein the tube portion, restrictor portion, and end closure are made of biodegradable material.

As used herein the term "paper" means a fibrous material characterized by a plurality of discrete fibers. As used herein the term "fibrous material" means a plurality of discrete fibers. The filaments can be plant or animal derived, synthetic, or some combination of these. In "plant-derived fibrous materials" the filaments are at least predominantly of plant origin, examples of which include wood, papyrus, rice, ficus, mulberry, fibers, cotton, yucca, sisal, bowstring hemp and New Zealand flax. Further, as used herein the term "fibrous wall" means a wall comprising a fibrous material as a significant structural constituent. The fibrous walls contemplated herein preferably have at least 2, 5, 10, 20 or even 30 dry weight percent of fibers. Preferably, the fibrous walls have at least 80 or 90 dry weight percent of fibers. Paper is generally a fibrous material that is usually made by pressing and de-watering moist fibers, typically cellulose pulp derived from wood, rags, or grasses. In some embodiments, the paper materials of the tube portion and the restrictor portion have substantially the same chemical composition.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein the terms "liquid" and "semi-solid composition" mean any semi-solid or other compound having a viscosity of at least 50 to 200,000,000 Centipoise. Preferred semi-solid compositions are medium viscosity compositions having a viscosity of 2,000 to 2,000,000 Centipoise, but low viscosity compositions in the range of at least 50 to less than 2000 Centipoise, as well as high viscosity compositions in the range of more than 2,000,000, up to 100,000,000 Centipoise are contemplated. Contemplated semi-solid compositions include toothpaste, cosmetic creams, over-the-counter paste medicines, polish, caulking, paint, grease, lip balm, lip stick, skin cream, shampoo, deodorant, liquid soap, toothpaste, and grease. Semi-solid foods such as ketchup, tomato paste, frosting, relish, and sauces are also contemplated.

As used herein, a "biodegradable material" means a material that will break down to at least 90% $H_2O$, $CO_2$, and biomass within a period of six months from the action of naturally occurring micro-organisms such as bacteria, fungi, algae etc. under favorable conditions. For example, meat, plants, wood, cotton, vegetable polymer, polylactic acid polymers (PLA), and paper are all deemed herein to be biodegradable. It is also contemplated that relatively minor amounts of non-biodegradable inputs can be used in the materials to form the tube portion, restrictor portion, and/or end closure member.

As used herein the term "coating" means a permeation barrier that is resistant to the intended contents of the container. Preferably, the coating provides a permeation barrier that has a transfer rate of less than or equal to (a) 50 μl of water and/or sunflower oil per cm2 for each mm of wall thickness per six-month period of time at room temperature and normal atmospheric pressure (STP) or (b) 10 ml to 100 ml, 10 ml to 200 ml, and less preferably 100 ml to 500 ml of oxygen per m2 per each 1 mm of wall thickness per 24 hour period of time, at STP. It is contemplated that the coating could be applied to parts of the container prior to assembly, or even after assembly. In preferred embodiments, the walls of the container comprise a rolled paper material upon which the coating has been coated on the interior and exterior surfaces of the walls. It is also contemplated that the coating can be: (1) on an exterior surface or interior surface of the container; (2) impregnated within the material forming the walls of the container; or (3) disposed between the layers or plies of walls of the container. Preferably, the coating is applied such that a permeation barrier exists for substantially all regions of the lumen. "Substantially all regions of the lumen" means a permeation barrier exists somewhere on the inner surfaces of the container, between the inner and outer surfaces of the container, or on the outer surfaces of the container for at least 95% of the surfaces defining the lumen. Thus, even if a non-barrier layer is buttressed by a barrier layer, this is still "substantially all regions of the lumen." As used herein, "lumen" means the inner space defined by the walls of the container.

In a preferred embodiment, the tube portion, restrictor portion, and end closure member are coated with a permeation barrier that is resistant to the intended contents of the container. The coating could comprise an adhesive, which can be any compound in a liquid or semi-liquid state used to adhere or bond items together, and which is formed from a biodegradable material. Prior to use, adhesives can be pastes (very thick) or glues (relatively fluid). All suitable adhesives are contemplated including for example casein glue made from water, milk vinegar and baking soda (e.g. a biodegradable adhesive). It is also contemplated that the coating can comprise a sugar cane protein or vegetable/plant polymer, such as polylactic acid polymers (PLA). Other suitable coating materials include those disclosed in U.S. Pat. No. 7,344,784 to Hodson or US20050130261 to Wils. Alternatively, the tube portion could have an impermeable liner of a suitable material such as cellulose acetate that is joined to either the interior surface of the tube, the interior of the restrictor portion or both. While a biodegradable coating is preferable, it is also contemplated that various non-biodegradable coatings or layers may be utilized to provide greater impermeability. It is thus contemplated that the coating and/or non-permeable layers of the tube, restrictor portion, and/or end closure member could comprise a gaseous disposition of aluminum onto a layer of polylactic acid polymer (PLA) or a thin plastic non-biodegradable layer.

The walls of the tube portion and the restrictor portion are preferably made of any suitable fibrous material, preferably biodegradable materials comprising paper, cardboard, or fiberboard. Wrapped materials seem to have the best strength and cost characteristics. For example, the tube portion can be made from wrapped 60 lb paper stock that is 100% post consumer waste. The restrictor portion is preferably made by a molding process and can comprise a fibrous material, latex, cork, vegetable polymer or any other comparable material.

In preferred embodiments, the flexible tube portion and the restrictor portion form a cylindrical shape having a tapered closed end and an open end. It is also contemplated that the walls of the tube portion and the restrictor portion could be shaped to have polygonal, oval or other horizontal cross-sectional shapes. In addition, the walls could even form a cone, or be frustoconical shaped. The wall of the tube portion and restrictor portion could be any thickness, but is preferably no more than 0.5 mm thick. As used herein the term "tube" means any compressible or non-compressible container used for housing objects, solids, liquids, and semi-solids. A "narrow tube" is one in which the length of the tube is at least $3/\pi$ times the cross-sectional area of the open end of the tube portion taken perpendicular to a long axis of the tube. The walls of the tube/restrictor portion typically include 1 to 5 layers or plies (e.g. wraps), and most preferably 3 layers of the paper/coating combination. As used herein, the term "flexible" with respect to the tube portion means that a user can realistically use his/her fingers to compress some portion of the walls of the tube portion sufficiently to dispense the semi-solid.

The walls of the tube portion preferably have an open end and a closed end. As used herein, the term "open end" means that the wall defines an opening that is ordinarily open during typical usage. Similarly, as used herein, the term "closed end" means that the wall defines an end that is ordinarily closed during typical usage. Under these definitions, an ordinary shampoo bottle is a container having a wall with an open top because the cap is either removed or disposed in an open position during typical usage. Also under these definitions, a Campbell's soup can with a pull tab top has a wall with an open top because the top is removed during typical usage. The bottom of such a soup can, however, is closed because the bottom is not removed during typical usage.

In exemplary embodiments the closed end of the tube portion is tapered to form a transverse seal that can be pinched, crimped, or folded, but any other suitable seal is contemplated. Advantageously, the end of the tube portion is tapered allowing a user to easily compress the tapered end of the tube to dispense the semi-solid composition. As used herein, "transverse seals" mean any type of seal that runs perpendicular to the longitudinal axis of the tube. It is also contemplated that the closed end can be folded inwardly to form a rim surrounding a center disc, or even have a cylindrical closed end.

The restrictor portion can mate with the tube portion by a snap fitting, flip-top, snug fit, screw threads, or any other suitable mating arrangement. As used herein the term "restrictor portion" means any object that can snugly fit over or inside the tube, or it could even be continuous with the tube. In preferred embodiments, the aperture of the restrictor portion could have an inside diameter no greater than 1 cm or the ratio between the large end of the restrictor portion and the aperture could be 100:1, 50:1, 20:1, 10:1, 5:1, 4:1, 2:1, or any other suitable ratio for the desired application of the tube.

In preferred embodiments, the restrictor portion is sized and dimensioned to slidably engage the open end of the tube portion. Preferred restrictor portions have a longitudinal dimension that are less than a longitudinal dimension of the tube portion; however it is contemplated that the restrictor portion could have a longitudinal dimension greater than the tube portion—to accommodate the tube portion being nested within the restrictor portion. In still other embodiments the restrictor portion can comprise an interior flat surface that pushes the semi-solid composition back into the tube portion when the restrictor portion mates with the tube portion, and also a sliding tapered insert could be disposed within the lumen of the tube portion to aid in the dispensing of the semi-solid composition Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 4 is a perspective view of a biodegradable tube having the restrictor portion.

FIG. 5 is a perspective view of an end closure member coupled to a tube portion and restrictor portion.

FIG. 6 is a cross-sectional view of one embodiment of a restrictor portion having internal threads that mate with external threads on an end closure member.

DESCRIPTION OF THE INVENTION

Figure 1:
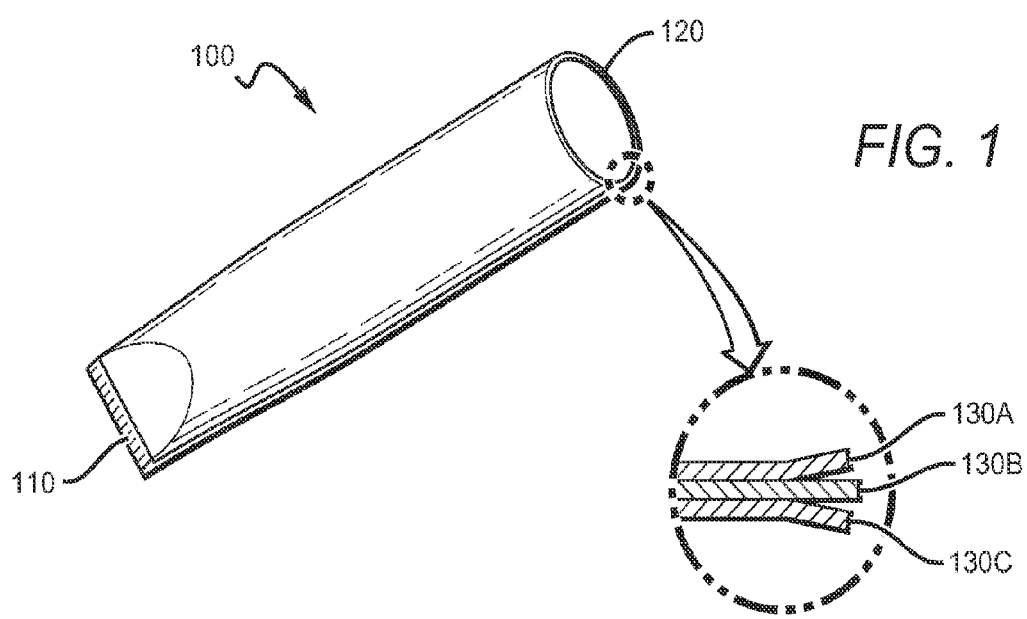
FIG. 1 is a perspective view of one embodiment of the biodegradable tube portion of the present invention illustrating the open end and a closed end of the tube portion.

FIG. 1 shows a flexible tube portion 100 having a closed end 110 and open end 120. In a preferred embodiment, tube portion 100 would largely consist of a fibrous material such as paper that has been impregnated or joined with a flexible biodegradable adhesive (i.e. coating). The tube can have at least one winding of paper, and preferably two or three wraps or plies for additional stability, as depicted by numerals 103A, 130B and 130C, and like the tube disclosed in co-pending application Ser. No. 12/435,852, which is incorporated herein by reference herein, but many additional layers or plies are contemplated depending on the particular use of the tube. It is also contemplated that the tube portion could be formed out of molded cellulose fiber. In addition, the tube portion can have an impermeable biodegradable liner, or be impregnated with a substance such as vulcanized latex, biodegradable polymers such as those described in U.S. Pat. No. 7,344,784 to Hodson, a cellulosic barrier material, wax, or other biodegradable substance that can effectively contain the tube's contents. Preferably, multiple layers of a biodegradable coating have been disposed between each layer of fibrous material. Alternatively, the tube portion could be substantially or entirely made of vulcanized latex or other flexible biodegradable materials such as polymerized vegetable oil. Closed end 110 has preferably been sealed by a crimping process.

Figure 2:
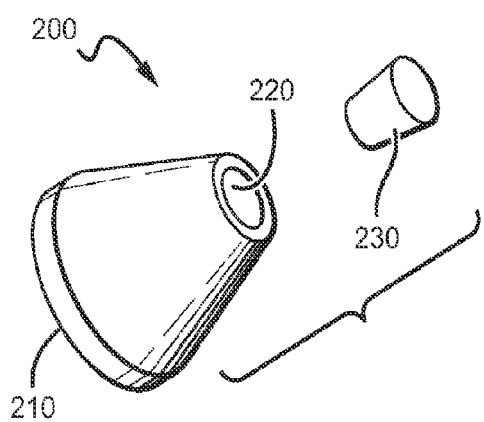
FIG. 2 is a perspective view of one embodiment of the biodegradable restrictor portion and end closure member.

FIG. 2 shows a restrictor portion 200 with large end 210 sized and dimensioned to couple with the open end of the tube portion, and an end closure member 230 that mates with aperture 220 in the restrictor portion. It is contemplated the end closure member 230 can be a cork stopper. A preferred restrictor portion 200 could be made of molded cellulose fiber, such as recycled paper pulp, that has an exterior dimension on one end to mate securely with the open end of the tube portion. Preferably both portions would be joined with an appropriate biodegradable adhesive or could form a continuous piece. It is contemplated that the restrictor portion 200 has an aperture 220 that has a smaller diameter than the interior diameter of the tube. Preferably, the difference in size between the interior of the tube diameter and the aperture diameter would provide for enough fibrous material to render the restrictor portion strong enough to hold up to repeated use and support a closure. Alternatively, the restrictor portion 200 could be made of specially shaped paper that has been layered (such as 1, 2, 3 or more plies) and joined with a biodegradable adhesive, or a combination of paper and molded pulp, or a combination of paper and flexible material such as latex that create a flexible restrictor portion. The aperture 220 could be sized to advantageously dispense the tube's intended contents as well.

Alternatively, the molded restrictor portion 200 could be molded entirely of a flexible material such as vulcanized latex rubber or a vegetable polymer. Preferably, the restrictor portion 200 could be a separate part that is joined to the tube portion or be integral to the tube portion. The molded restrictor portion would preferably have an impermeable biodegradable liner or interior surface, or be impregnated with a substance such as vulcanized latex, biodegradable polymers such as described in US to Hodson, a cellulosic barrier material, wax, or other biodegradable substance that can effectively contain the tubes contents.

It is contemplated that the restrictor portion is sized and dimensioned to accommodate an end closure member, such as a stopper or tapered cork or other suitable stopper. A stopper such as the Hybrid Closure For Containers, application number U.S. 61/171,221 to West could be advantageously accommodated as well. Alternatively, the stopper could be made of any appropriate biodegradable material such as molded fibers, wood or latex rubber.

Another preferred stopper 230 is molded vulcanized latex rubber tapered and sized to snugly fit the aperture 220 and which has a flexible connector portion that is embedded or otherwise attached to the restrictor portion. This embodiment allows easy access to the tube contents and provides a secure closure after use, while also providing a closure that would not be separated from the tube during regular use. It is also contemplated that end closure member could be a flip-top that utilizes hinges to form a pressure fitted closure.

Figure 3:
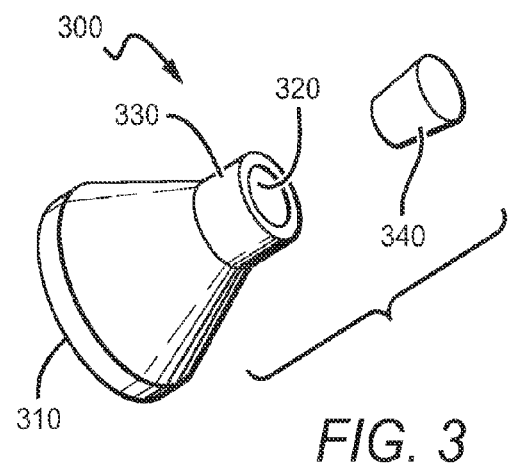
FIG. 3 is a perspective view of an alternative embodiment of a biodegradable restrictor portion and end closure member.

FIG. 3 shows an alternative molded paper or latex restrictor portion 300 with large end 310 sized to fit within an open end of the tube portion, and aperture 320 having an end closure receiver section 330 that mates with a end closure member 340. It is contemplated that the end closure member 340 could be a latex rubber stopper or other commercially suitable material.

FIG. 4 depicts the tube portion 430 mating with the restrictor portion 440. It is contemplated that the tube portion 430 can have a crimped end 410 and the restrictor portion 440 can have aperture 420. It is contemplated that the restrictor portion 440 can couple with the open end of the tube portion in any suitable manner. It is also contemplated that the tube portion 430 and the restrictor portion 440 can be made as one piece or unit.

FIG. 5 shows a joined tube and restrictor 500 having a crimped end 510, aperture 520 and a flip top end closure member 530 that is attached to the restrictor by a flexible attachment 540 which can be imbedded or integral to joined tube and restrictor 500.

FIG. 6 shows a cross-sectional view of an alternative restrictor portion 600 having walls 610 and threaded shoulder 620. Shoulder 620 provides threads which mate with external threads on end closure member 630. Walls 610 of the restrictor portion 600 are preferably made of a biodegradable fibrous material or other material contemplated herein. It is also contemplated that end closure member 630 and restrictor portion 600 can be designed to function as a screw-on overcap, such that the end closure member has internal threads, which interact with external threads on an exterior surface of the restrictor portion, for example, such a mechanism is found in virtually all existing toothpaste tubes. Threaded shoulder 620 and end closure member 630 are preferably made of a biodegradable vegetable polymer, such as PLA, providing a secure and reusable closure. Further, walls 610, shoulder 620, and end closure member 630 are preferably impermeably to the intended contents. Walls 610 could contain multiple layers having a biodegradable coating impregnated between the layers, and shoulder 620 and end closure member 630 could contain additives within the PLA, providing a permeation barrier.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A biodegradable container for a semi-solid composition, comprising:
    a tube portion comprising a first paper that defines first, second, and third plies forming an open end and a closed end, and a lumen containing the semi-solid composition, wherein the tube portion further comprises a continuous coating that is disposed between the first and second plies, and between the second and third plies, and wherein the coating is a permeation barrier to the semi-solid composition;
    a restrictor portion sized and dimensioned to couple with the open end of the tube portion;
    an end closure member sized and dimensioned to mate with the restrictor portion; and
    wherein each of the tube portion, restrictor portion, and end closure member is biodegradable and are made of one or more biodegradable materials.

2. The container of claim 1, wherein the tube portion has a wall thickness of no more than 0.5 mm.

3. The container of claim 1, wherein at least one of the tube portion, restrictor portion, and the end closure member comprise at least one of a fibrous material, molded cellulose fiber, vulcanized latex, and vegetable polymer.

4. The container of claim 1, wherein the closed end of the tube portion has a transverse seal.

5. The container of claim 4, wherein the transverse seal is formed by at least one of crimping and folding.

6. The container of claim 1, wherein at least one of the tube portion and restrictor portion has a biodegradable liner that includes a permeation barrier to the semi-solid composition.

7. The container of claim 1, wherein the tube portion is impregnated with vulcanized latex.

8. The container of claim 1, wherein at least one of the restrictor portion and end closure member have a second coating.

9. The container of claim 8, wherein the second coating comprises an adhesive.

10. The container of claim 8, wherein the second coating comprises a metal layer.

11. The container of claim 8, wherein the second coating is biodegradable.

12. The container of claim 8, further comprising a third coating disposed on an outside surface of the tube portion.

13. The container of claim 8, wherein the second coating is impregnated within the tube portion.

14. The container of claim 1, wherein the end closure member comprises at least one of a cork stopper, a latex rubber stopper, and a molded vegetable polymer screw cap.

15. The container of claim 11, wherein the end closure member further comprises a flip top end closure member that is coupled to the restrictor portion by a flexible attachment.

16. The container of claim 1, wherein the restrictor portion comprises a first, second, and third ply of a second paper.

17. The container of claim 16, wherein the coating is biodegradable.

18. The container of claim 1, wherein the restrictor portion is molded from a pulp slurry.

19. The container of claim 1, wherein the coating is an adhesive that affixes the first ply to the second ply, and the second ply to the third ply.

20. A biodegradable container for a semi-solid composition, comprising:
    a tube portion comprising a first paper that defines first, second, and third plies forming an open end and a closed end, and a lumen containing the semi-solid composition, wherein the tube portion further comprises a continuous, biodegradable coating that is disposed between the first and second plies, and between the second and third plies, and wherein the coating functions as a permeation barrier to the semi-solid composition;
a restrictor portion sized and dimensioned to couple with the open end of the tube portion;
an end closure member sized and dimensioned to mate with the restrictor portion; and
wherein the tube portion, restrictor portion, and end closure member are made solely of one or more biodegradable materials.

* * * * *